(12) United States Patent
Choi et al.

(10) Patent No.: US 12,516,310 B2
(45) Date of Patent: Jan. 6, 2026

(54) COMPOSITION COMPRISING COLLAGENASE, CALCIUM, HISTIDINE, AND GLYCINE, AND METHOD FOR STABILIZING COLLAGENASE

(71) Applicant: CONNEXT Co., Ltd, Daegu (KR)

(72) Inventors: Chi Min Choi, Seongnam-si (KR); Choong Sun Ryu, Daejeon (KR); Sung Hee Kim, Gyeongsan-si (KR)

(73) Assignee: CONNEXT Co., Ltd, Daegu (KR)

( * ) Notice: Subject to any disclaimer, the term of this patent is extended or adjusted under 35 U.S.C. 154(b) by 0 days.

(21) Appl. No.: 18/948,388

(22) Filed: Nov. 14, 2024

(65) Prior Publication Data

US 2025/0101404 A1    Mar. 27, 2025

Related U.S. Application Data

(63) Continuation of application No. 18/844,623, filed as application No. PCT/KR2023/003188 on Mar. 8, 2023.

(30) Foreign Application Priority Data

Mar. 8, 2022    (KR) .................. 10-2022-0029068

(51) Int. Cl.
   *C12N 9/96*    (2006.01)
   *C12N 9/52*    (2006.01)
   *C12N 9/64*    (2006.01)

(52) U.S. Cl.
   CPC .............. *C12N 9/96* (2013.01); *C12N 9/52* (2013.01); *C12N 9/6489* (2013.01); *C12N 9/6491* (2013.01); *C12Y 304/24003* (2013.01); *C12Y 304/24007* (2013.01)

(58) Field of Classification Search
   None
   See application file for complete search history.

(56) References Cited

U.S. PATENT DOCUMENTS

2014/0274902 A1    9/2014    Wang et al.

FOREIGN PATENT DOCUMENTS

| | | |
|---|---|---|
| CN | 110408591 A | 11/2019 |
| JP | 2007224052 A | 9/2007 |
| JP | 2012503487 A | 2/2012 |
| JP | 2019519524 A | 7/2019 |
| JP | 2022516569 A | 2/2022 |
| KR | 2000-0060771 A | 10/2000 |
| KR | 10-1863920 B1 | 6/2018 |
| KR | 10-2033197 B1 | 10/2019 |
| KR | 10-2019-0136030 A | 12/2019 |
| KR | 10-2021-0113271 A | 9/2021 |
| KR | 10-2022-0135053 A | 10/2022 |
| KR | 10-2024-0163906 A | 11/2024 |
| WO | 94/24272 A1 | 10/1994 |
| WO | 2008/084237 A2 | 7/2008 |
| WO | WO-2020142701 A1 * | 7/2020 ......... A61K 31/7016 |

OTHER PUBLICATIONS

International Search Report for PCT/KR2023/003188 dated Jun. 9, 2023.
Extended European Search Report dated May 14, 2025 in Application No. 23767171.4.
Communication dated Sep. 2, 2025 issued by the Japanese Patent Office in application No. 2024-553388.

* cited by examiner

*Primary Examiner* — Manjunath N Rao
*Assistant Examiner* — Jae W Lee
(74) *Attorney, Agent, or Firm* — Sughrue Mion, PLLC

(57) ABSTRACT

The present invention provides a composition comprising collagenase as an enzyme; calcium, histidine, and glycine as coenzymes, and a method for stabilizing enzymes, the method comprising the preparation of the composition by adding histidine and glycine to collagenase. According to the present invention, the enzyme composition and method for stabilizing enzymes can minimize or inhibit the agglutination of enzymes, maintain the concentration of freeze-dried enzymes even during long-term storage, and provide a formulation that has excellent rehydration time and hygroscopicity when restored to a liquid state, as well as superior enzyme activity.

11 Claims, No Drawings

COMPOSITION COMPRISING COLLAGENASE, CALCIUM, HISTIDINE, AND GLYCINE, AND METHOD FOR STABILIZING COLLAGENASE

CROSS-REFERENCE TO RELATED APPLICATIONS

This application is a Continuation of U.S. application Ser. No. 18/844,623 filed Sep. 6, 2024, which is a National Stage of International Application No. PCT/KR2023/003188 filed Mar. 8, 2023, claiming priority based on Korean Patent Application No. 10-2022-0029068 filed Mar. 8, 2022, the entire disclosures of which are incorporated herein by reference.

TECHNICAL FIELD

The present invention relates to a composition containing collagenase, calcium, histidine and glycine, and a method of stabilizing the enzyme. More specifically, the present invention relates to a composition containing collagenase, calcium, histidine and glycine to provide increased stability and a method of stabilizing collagenase using the same.

BACKGROUND ART

Collagen is a major component of mammalian organisms and constitutes a large proportion of the total protein content of the skin and other parts of the animal body. Collagen is important for humans, particularly, during wound healing and natural aging processes. Various skin traumas such as burns, surgery, infections and accidents are often characterized by irregular accumulation of collagen-rich fibers and increased content of proteoglycan. In addition to replacement of damaged or destroyed normal tissue, excessive and malformed deposits of new tissue are often formed during the treatment process. Excessive collagen deposition is caused by disturbed balance between collagen synthesis and collagen degradation.

A number of diseases and disorders are associated with excessive collagen deposition and irregular accumulation of collagen-rich fibrous tissue. These diseases and disorders are broadly referred to as "collagen-mediated diseases". Collagenase has been used to treat a variety of collagen-mediated diseases. Collagenase is an enzyme that has the specific ability to digest collagen.

Collagenase for therapeutic applications may be obtained from a variety of sources including collagenase from mammals (e.g. humans), crustaceans (e.g. crabs, shrimp), fungi, and bacteria (e.g. from fermentation of *Clostridium, Streptomyces, Pseudomonas* or *Vibrio*). Collagenase has also been genetically engineered. One common source of f crude collagenase is obtained by bacterial fermentation, specifically, fermentation of *C. histolyticum*. Crude collagenase obtained from *C. histolyticum* may be purified using a number of chromatographic methods.

Meanwhile, proteins including enzymes may lose biological activity due to physiological instability (e.g., denaturation or formation of aggregates), and chemical instability, such as hydrolysis, oxidation, and deamidation. The stability of proteins is also affected by factors such as pH, temperature, storage period, and number of freeze-thaw cycles.

In order to ensure stability, therapeutic protein preparations are usually provided as lyophilized proteins that are dissolved in a separately packaged aqueous diluent (often also called a "solvent") immediately before use, or as a protein solution that contains an additive to improve stability. For example, additives such as free amino acids (e.g. leucine, tryptophan, serine, arginine and histidine) useful for preparing protein solutions have been proposed. Some protein preparations currently available on the market contain proteins as stabilizers. For example, human serum albumin or purified gelatin are used to inhibit chemical and physical changes in protein solutions. However, addition of these proteins involves complicated processes to remove viral contamination.

In addition, lyophilization is another approach to ensure stability. However, this process increases preparation costs and involves an increased risk of inappropriate administration because the lyophilized protein should be dissolved immediately before use. Lyophilization aims at removing water from preparations because harmful physical and chemical reactions often occur in the aqueous phase. That is, lyophilization is performed due to stability reduction in an aqueous liquid phase. However, although lyophilization is performed, the problems described above and problems associated with storage stability remain.

Meanwhile, when a liquid formulation is prepared using collagenase as an enzyme, there is a problem in that water-soluble aggregates are produced due to acute stress. In addition, although lyophilization is performed, there are problems of lowered concentration, increased liquid reconstitution time, and increased moisture content. In some cases, enzyme activity was reduced, thus making formulation into a powder difficult. Moreover, collagenase requires calcium as a coenzyme. When calcium is added in order to prepare a lyophilized collagenase powder, there are problems that the lyophilized powder is not formed properly and the desired specifications of collagenase are not properly preserved, thus making development of formulation into a powder more difficult.

Therefore, most collagenase formulations currently commercially available are provided in separate vials containing a lyophilized collagenase powder and a calcium-containing buffer, and then the lyophilized collagenase powder is mixed with the calcium-containing buffer immediately before use to prepare a finished injection. In other words, when a lyophilized powder is prepared by incorporating calcium in collagenase, the finished injection can be prepared by simply using water for injection immediately before use to obtain the finished injection without separately preparing a buffer containing calcium, thus advantageously greatly reducing preparation costs. However, the development of such technology remains insufficient.

Accordingly, the present invention provides a method of preparing a calcium-containing collagenase lyophilized powder to prevent the problems described above.

Major related prior patents include PCT International Patent Publication No. WO 2020-142701 (published on Jul. 9, 2020).

DISCLOSURE

Technical Problem

Therefore, it is an object of the present invention to provide a powder formulation that minimizes aggregation of a collagenase enzyme, avoids reduction of concentration of the lyophilized enzyme even during long-term storage, exhibits excellent liquid reconstitution time (dissolution time) and moisture content, and maintains and reconstitutes excellent activity of the enzyme by using several formulation additives conceived by the present invention although a collagenase lyophilized powder is prepared by incorporating calcium therein.

Technical Solution

In accordance with one aspect of the present invention, provided is a composition containing collagenase as an enzyme, calcium as a coenzyme, histidine as a formulation additive, and glycine as another formulation additive.

In the composition of the present invention, the content of the collagenase enzyme is preferably 0.3 to 20.8% by weight based on the total weight of the composition.

In the composition of the present invention, the calcium is preferably present in the form of a calcium salt.

In the composition of the present invention, the calcium or calcium salt is preferably present in an amount of 0.4 to 28% by weight based on the total weight of the composition.

In the composition of the present invention, the histidine is preferably present in an amount of 0.4 to 29.9% by weight based on the total weight of the composition.

In the composition of the present invention, the glycine is preferably present in an amount of 15 to 94.6% by weight based on the total weight of the composition.

The composition of the present invention preferably further contains trehalose as another formulation additive.

The composition of the present invention preferably further contains polysorbate 20 (PS20) as a surfactant.

In the composition of the present invention, the pH of the composition is preferably 6.0 to 7.0.

In the composition of the present invention, the composition is preferably a lyophilized formulation.

In another aspect of the present invention, provided is a solution prepared by mixing the lyophilized composition of the present invention with a diluent.

Advantageous Effects

The present invention has an effect of minimizing or suppressing formation of water-soluble aggregates even when acute stress is applied although a collagenase lyophilized powder containing calcium is prepared using various formulation additives developed in the present invention. In addition, the present invention has the effects of avoiding reduction of the concentration of lyophilized collagenase even during long-term storage and maintaining excellent enzyme activity. In addition, the composition of the present invention has the effect of minimizing the time for dissolving the lyophilized preparation in water for injection and lowering the moisture content during lyophilization. Furthermore, the composition of the present invention can extend the period during which it maintains activity at room temperature even after dissolving the lyophilized preparation in water for injection, can maintain stability for a long period of time when the liquid preparation is separately used, and can improve enzyme stability in vials containing the composition and reduce the amount of enzyme adsorbed to the vial.

In addition, from an economic perspective, the composition of the present invention eliminates the necessity of separately preparing a solution containing calcium, thus advantageously preparing collagenase formulations more economically.

BEST MODE

Hereinafter, reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments, which may be included within the spirit and scope of the invention as defined by the appended claims. In the following description of the present invention, detailed descriptions of functions known and configurations incorporated herein will be omitted when it may obscure the subject matter of the present invention.

Singular forms are intended to include plural forms as well, unless the context clearly indicates otherwise. The terms used herein are merely used to describe specific embodiments and are not intended to limit the invention. Singular forms are intended to include plural forms as well, unless the context clearly indicates otherwise. It will be further understood that the term "comprises" or "has", when used in this specification, specifies the presence of stated features, numbers, steps, operations, elements, components or combinations thereof, but does not preclude the presence or addition of one or more other features, numbers, steps, operations, elements, components, or combinations thereof.

It will be understood that, although the terms "first", "second", etc. may be used herein to describe various elements, these elements should not be construed as being limited by these terms, which are used only to distinguish one element from another.

In one aspect, the present invention provides a composition containing collagenase as an enzyme, calcium as a coenzyme, histidine as a formulation additive, and glycine as another formulation additive.

Collagenase requires calcium ions as a coenzyme to provide structural stability and increase substrate affinity. The source of calcium ions is generally a calcium salt, and calcium chloride is a commonly used calcium salt. However, calcium chloride is inherently deliquescent and thus prevents freezing when added to an aqueous solution. Therefore, in the development of a lyophilized formulation with calcium chloride, a specific formulation must be developed to increase the stability of collagenase in order for the freezing process to proceed smoothly. In addition, a specific formulation must be used to overcome the deliquescence of calcium chloride when drying in a vacuum after freezing and to sufficiently remove moisture to complete drying.

A vial containing lyophilized collagenase and a vial containing a solvent to dissolve the lyophilized collagenase and supply calcium ions are usually separately provided because it is difficult to lyophilize a substance containing calcium chloride. Providing two vials results in an increase in preparation cost. Therefore, a collagenase formulation containing calcium chloride has the advantages of preparation convenience and reduced preparation cost. Based thereon, the present invention has been completed.

In an embodiment, collagenase used as an enzyme herein is not necessarily limited to a specific enzyme, and may be, for example, collagenase I, collagenase II, or a mixture thereof.

Calcium used as a cofactor herein is preferably a calcium salt, for example, calcium chloride. The calcium acts as a coenzyme for the activity of collagenase. In other words, calcium acts as an activator or cofactor for enzymes, collagenase activity may be stabilized by 0.1 mole of calcium ions ($Ca^{2+}$) per mole of enzyme, and 4 calcium ions facilitates bonding to collagen molecules.

The composition of the present invention contains histidine as a formulation additive and glycine as another formulation additive.

As used herein, the term "formulation additive" refers to a compound that can form or maintain the formulation of the present invention, or solve problems in the formulation that may occur in the absence of this additive.

Histidine used as a formulation additive herein acts as a buffer component. Preferably, L-histidine is used. In conventional methods, various types of buffers have been used to adjust pH in pharmaceutical compositions. As can be seen from the examples described later, the present inventors conducted various experiments using sodium phosphate, sodium acetate, succinate, histidine, and Tris as buffers for formulation buffering. The result showed that, when sodium phosphate was used as a buffer, precipitates such as calcium phosphate were observed, and histidine exhibited the best purity and potency stability among buffers.

Glycine used as a formulation additive herein serves as a bulking agent. In conventional methods, various types of sugars, amino sugars, sugar alcohols, and amino acids have been used as bulking agents in pharmaceutical compositions. Examples of bulking agents include: monosaccharides such as glucose, mannose, galactose, fructose, and sorbose; disaccharides such as sucrose, lactose, maltose, and trehalose; trisaccharides such as raffinose; and sugar alcohols such as xylitol, sorbitol, mannitol, and inositol. As amino acids, basic amino acids such as glycine, arginine, lysine, histidine, and ornithine are mainly used. As can be seen from the examples described later, the present inventors conducted various experiments using mannitol and glycine as bulking agents for formulation buffering. The result showed, when mannitol was used as a bulking agent, there were problems such as a decrease in concentration under temperature acceleration conditions, a delay in the liquid reconstitution time, high moisture content, an increase in HMWS (%), and an increase in the concentration of fine particles. Rather than other bulking agents, glycine exhibited the best purity and potency stability. That is, the composition of the present invention contains glycine as a formulation additive, which has the effects of minimizing the time to reconstitute from the lyophilized preparation to the liquid phase of water for injection and of lowering the moisture content during lyophilization.

In addition, in one embodiment, the present invention may further contain trehalose as a formulation additive. Trehalose, used as a formulation additive, acts as an osmotic regulator. Preferably, trehalose dihydrate is used. In general, an osmotic regulator refers to a compound or substance that acts as a protective agent in a pharmaceutical composition and is added to increase the stability of the active substance during or after the drying process or to ensure long-term storage stability of the resulting dry powder. Suitable protective agents are generally readily soluble in solution and do not thicken or polymerize when contact water.

For example, suitable protective agents include, but are not limited to, proteins such as human and bovine serum albumin, egg white, gelatin, immunoglobulin, whey protein, soy protein, caseinate, gelatin, and immunoglobulin, carbohydrates such as monosaccharides (such as galactose, D-mannose, and sorbose), disaccharides (such as lactose, trehalose, and sucrose), amino acids such as monosodium glutamate, lysine, glycine, alanine, arginine, and histidine, as well as hydrophobic amino acids (such as tryptophan, tyrosine, leucine, and phenylalanine); methylamine such as betaine; excipient salts such as magnesium sulfate; polyols such as trivalent or higher sugar alcohols (such as glycerin, erythrol, glycerol, arabitol, xylitol, sorbitol, and mannitol); propylene glycol; polyethylene glycol; poloxamers; surfactants; and mixtures thereof.

As can be seen from the examples described below, the present inventors conducted various experiments using sodium chloride (NaCl), sorbitol, and trehalose as osmotic regulators for formulation buffering. The result showed that, when sodium chloride or sorbitol was used as an osmotic regulator, the concentration or content of the active ingredient was reduced or the active ingredient decomposed, and stability was deteriorated, while, when trehalose was used, stability was maintained even when stored at high temperatures for a long period of time. Trehalose is a non-reducing sugar formed by linking two molecules of glucose through an $\alpha(1\rightarrow1)\alpha$ glycosidic bond. This bond allows trehalose to exhibit very strong resistance to acid hydrolysis and to be stable even under acidic conditions and at high temperatures.

In an embodiment, the composition according to the present invention may have a pH of 6.0 to 7.0. As mentioned above, the composition of the present invention contains histidine as a buffer. The present inventors found that the pH of the composition may vary depending on the type of buffer used. Therefore, when the pH of the composition according to the present invention was 6.0 to 7.0, purity and potency stability were the best.

The buffer may be used in the composition of the present invention without particular limitation as long as it has a pH of about 6.5, similar to histidine and other types of buffers may be used instead of or in addition to histidine. Examples of buffers that may be used for pH 6.5 may include MES, bis-tris, ADA, ACES, PIPES, MOPSO, and bis-tris propane.

In one embodiment, the composition according to the present invention may further contain polysorbate 20 (PS20) as a surfactant.

In general, surfactants are commonly used in pharmaceutical compositions. A surfactant can reduce the tendency of proteins to unfold by reducing the tension between the interfaces, or dissolve proteins by reducing the number of proteins present at the interface thereof. In addition, the surfactant may protect proteins from surface-induced denaturation and aggregation.

Accordingly, the composition according to the present invention may contain any one of various surfactants known in the art without particular limitation. For example, the composition may contain polysorbate 20 or 80 (PS20 or PS80), poloxamer 188 (Pluronic 68), polyoxyethylene-polyoxypropylene polymers such as Tween®, a nonionic surfactant containing a hydrophilic polyoxyethylene head group and a hydrophobic fatty acid tail or the like. As a result of testing various types of surfactants, the present inventors found that polysorbate 20 (PS20) was the most effective.

In an embodiment, the composition according to the present invention may be a lyophilized formulation. In addition, the composition may be used to stabilize the lyophilized formulation.

The lyophilized formulation is a solid preparation obtained by lyophilizing a composition containing collagenase as an enzyme, calcium as a coenzyme, histidine as a formulation additive, and glycine as a formulation additive.

In addition, in the present invention, the composition may be a formulation of a solution to be lyophilized, or a formulation of a solution prepared from the lyophilized composition and a diluent. That is, the composition may be a solution prior to lyophilization that contains a solvent in addition to enzymes, histidine, and glycine, or may be a liquid prepared by dissolving the lyophilized solid preparation in a diluent. The diluent may be water for injection. In an embodiment, the concentration of collagenase enzyme in the solution may vary depending on the indication and is, for example, 2.9, 2.3, or 0.225 mg/mL.

When the composition containing the enzyme is a lyophilized solid preparation, the stability of the enzymatic activity is excellent. When the composition containing the enzyme is a liquid formulation, the stability of the enzymatic activity is reduced compared to the solid formulation, whereas the composition according to the present invention maintains the stability of the enzymatic activity even in the liquid formulation. That is, according to the present invention, even after the lyophilized preparation is reconstituted to a liquid as water for injection, the period during which the lyophilized preparation remains active at room temperature can be extended. Therefore, when the liquid preparation is separately used, stability can be maintained for a long period of time. The lyophilized preparation can improve the enzyme stability in vials containing the composition and reduce the amount of enzyme adsorbed to the vial.

In one embodiment, in the present invention, the content of the collagenase enzyme may be 0.3 to 20.8% by weight based on the total weight of the composition. Alternatively, the collagenase enzyme may be present in an amount of 0.09 to 9 mg per 3 cc vial. The amount of collagenase enzyme added may be varied depending on the indication. However, the collagenase enzyme should be used as long as the effect can be achieved and the occurrence of side effects can be prevented.

In one embodiment, the content of calcium or calcium salt may be 0.4 to 28% by weight based on the total weight of the composition. Alternatively, the calcium or calcium salt may be present in an amount of 0.132 to 13.2 mg per 3 cc vial. When the content of calcium or calcium salt is less than the range defined above, the activity of the enzyme may decrease due to lack of coenzyme function, and when the content of calcium or calcium salt exceeds the range, there is a disadvantage in that excessive precipitates or aggregates may be formed.

In one embodiment, the content of histidine may be 0.4 to 29.9% by weight based on the total weight of the composition. Alternatively, the histidine may be present in an amount of 0.144 to 14.4 mg per 3 cc vial. When the content of histidine is less than the range defined above, the pH of the composition may change and thus potency stability may decrease, and when the content of histidine exceeds the range, excessive precipitates or aggregates may be formed.

In one embodiment, the content of glycine may be 15 to 94.6% by weight based on the total composition. Alternatively, the glycine may be present in an amount of 2.25 to 225 mg of glycine per 3 cc vial. When the glycine content is less than the above range, stability may decrease when stored at high temperature for a long period of time, and when it exceeds the above range, excessive sedimentation or aggregation may occur.

In one embodiment, the content of trehalose may be 3.3 to 77.4% by weight based on the total composition. Alternatively, trehalose may be present in an amount of 0.90 to 90 mg per 3 cc vial. When the content of trehalose is less than the above range, resistance to acid hydrolysis may be weakened and stability may be reduced when stored at high temperatures for a long period of time, and when the trehalose content exceeds the above range, the resistance to acid hydrolysis may be deteriorated. In this case, there is a disadvantage that excessive precipitates or aggregates may be formed.

In one embodiment, the content of polysorbate 20 (PS20) may be 0.03 to 2.5% by weight based on the total composition. Alternatively, polysorbate 20 (PS20) may be present in an amount of 0.009 to 0.9 mg per 3 cc vial. When the content of polysorbate 20 is less than the above range, denaturation of the enzyme may occur quickly, and when the content of polysorbate 20 exceeds the above range, there is a disadvantage in that excessive precipitates or aggregates may be formed.

Another embodiment of the present invention provides a method of stabilizing collagenase including adding calcium as a coenzyme, and histidine as a formulation additive, and glycine as a formulation additive to collagenase as an enzyme, to prepare a composition, and lyophilizing the composition.

First, the composition is prepared by adding histidine and glycine to collagenase as the enzyme. The collagenase enzyme is preferably added in an amount of 0.3 to 20.8% by weight based on the total weight of the composition, the histidine is preferably added in an amount of 0.4 to 29.9% by weight based on the total weight of the composition, and the glycine is added in an amount of 0.4 to 29.9% by weight based on the total weight of the composition. The glycine is preferably added in an amount of 15 to 94.6% by weight based on the total weight of the composition.

The enzymes, coenzymes, histidine, glycine, trehalose, and polysorbate 20 (PS20) used herein are as described above. By adding histidine and glycine as formulation additives, the stability of the enzyme can be maintained when the composition is in solid or liquid phase.

Then, the prepared composition is lyophilized. Lyophilization may be carried out using any method known in the art.

Then, the lyophilized composition may be dissolved in a diluent to prepare a solution. When the composition according to the present invention is formed as a liquid preparation, the enzyme activity is still maintained.

The present invention provides a method of stabilizing an enzyme, including adding histidine and glycine to the enzyme to prepare a composition. According to the method of stabilizing enzymes according to the present invention, it is possible to prepare a formulation that can minimize or suppress aggregation of enzymes, can prevent the concentration of the lyophilized enzyme even when stored for a long period of time, and exhibit excellent liquid reconstitution time and moisture content as well as excellent activity.

The present invention will be better understood from the following examples, which are provided merely for illustration and are not intended to limit the scope of the present invention defined by the appended claims.

Example 1: Preparation of Raw Materials

In this example, collagenase was used as an active pharmaceutical ingredient (API) enzyme. That is, recombinant collagenase I (CNXT1) and recombinant collagenase II (CNXT2) were separately prepared to obtain a CNXT1 stock solution and CNXT2 stock solution, and then the solutions are mixed to prepare a collagenase mixed solution (CNT201).

Specifically, the recombinant collagenase I (CNXT1) and recombinant collagenase II (CNXT2) are obtained as high-purity collagenase I and II solutions by introducing expression vectors carrying genes encoding foreign proteins (collagenase I and II) into an *E. coli* cell line, respectively, to obtain transformants, expressing the foreign proteins using transformants, and then performing culture, recovery and purification. In the final step of the purification process among the processes, each of the recombinant collagenase I (CNXT1) and recombinant collagenase II (CNXT2) obtained in the previous step is substituted with a buffer containing a mixture of histidine and calcium chloride to obtain the following CNXT1 stock solution and CNXT2 stock solution.

(1) CNXT1 stock: CNXT1 (recombinant Collagenase I) 2.03 mg/mL, 10 mM L-Histidine, 10 mM Calcium Chloride, pH 7.0
(2) CNXT2 stock: CNXT2 (recombinant collagenase II) 1.97 mg/mL, 10 mM L-histidine, 10 mM calcium chloride, pH 7.0

Then, the CNXT1 stock solution and the CNXT2 stock solution were mixed in equal amounts based on the weight of protein to prepare a mixed solution (CNT201) with a collagenase concentration of 2.00 mg/mL.

In addition, chemical ingredients and raw materials used for formulations and analysis of CNT201 are as follows.

(1) L-Histidine: J. T. Baker, Cat #2080-05, Batch #0000181214
(2) Calcium chloride dihydrate: Sigma, Cat #12022-1 KG, Lot #BCCB9183
(3) Super refined polysorbate 20: Croda, Cat #SR40606, Batch #0001204756
(4) Super refined polysorbate 80: Croda, Cat #SR48833, Batch #0001603779
(5) Poloxamer 188: Spectrum, Cat #P1169, Batch #2EK0152
(6) Glycine: J. T. Baker, Cat #0581-01, Batch #0000226798
(7) Succinic acid: Sigma, Cat #398055-1 KG, SLBZ5010
(8) Mannitol: J. T. Baker, Cat #2553-01, Batch #0000253262
(9) Sodium succinate dibasic hexahydrate: Sigma, Cat #S2378-1 KG, Lot #SLBX5905
(10) Trehalose dihydrate: Pfanstiehl, Cat #T-104-4, Lot #404441A
(11) Sodium chloride: EMD Millipore, Cat #1.06604.5000, Lot #K51865804002
(12) Glacial acetic acid: EMD Millipore, Cat #AX0073-9, Lot #49287
(13) Tromethamine (Tris): J. T. Baker, Cat #4102-01, Batch #0000229888
(14) Imidazole: Sigma-Aldrich, Cat #12399-100G, Lot #SLCG0769
(15) HEPES: VWR, Cat #0511-250G, Lot #18G1856652
(16) Sodium Azide: VWR, Cat #0639-250G, Lot #0386C067
(17) Tricine: Sigma-Aldrich, Cat #5704-04-1, Lot #SLCC2910
(18) Calcium Chloride: Sigma-Aldrich, Cat #10043-52-4, Lot #SLBT0806
(19) FALGPA: Bachem A G, Cat #M1385.0100, Lot #1075966
(20) Sodium Acetate Trihydrate: J. T. Baker, Cat #JT3461-1, Lot #0000130474
(21) Sorbitol: EMD Millipore, Cat #1.11597.1003, Lot #M835497840
(22) Sodium Phosphate Monobasic Monohydrate: J. T. Baker, Cat #3802-01, Batch #0000126400
(23) Sodium Phosphate Dibasic Dihydrate: Sigma-Aldrich, Cat #04272-1 KG, Lot #BCCB8057

Example 2: Preparation of Liquid Formulation

A liquid formulation for collagenase was prepared using the collagenase mixed solution (CNT201) prepared in Example 1.

Specifically, 7.8 mL of a mixed solution with a collagenase concentration of 2.0 mg/mL was added to 8 dialysis cassettes (slide-A-lyzer dialysis Cassette, 3500 MWCO) to prepare eight samples, and then the dialysis cassettes were respectively immersed in the formulation buffers F1 to F8 shown in Table 1 below and allowed the mixtures to reach equilibrium. The mixed solution is exchanged into each formulation through the dialysis membrane of the dialysis cassette. After sufficient time had elapsed to complete equilibration, the collagenase solution was recovered from the dialysis cassette and respective formulation buffer was added to dilute such that the collagenase concentration reached 0.232 mg/mL. Formulation buffers contain 10 mM sodium acetate, histidine, or Tris as a buffer, 150 mM sodium chloride (NaCl) or 5% sorbitol as a tonicity modifier, 10 mM calcium chloride ($CaCl_2$) as a coenzyme, and 0.01% polysorbate 20 (PS20) as a surfactant, and contains no bulking agent.

The control group, F13, was prepared by diluting the collagenase mixed solution (CNT201) in 10 mM L-histidine, 10 mM calcium chloride, and pH 7.0 buffer such that the collagenase concentration reached 0.232 mg/mL, and then adding the stored 10% PS20 solution thereto to obtain 0.01% PS20.

TABLE 1

| Form. No. | Form. Code | Form. Type | Buffer (10 mM) | pH | Tonicity Modifier | $CaCl_2$ | Bulking Agent | API (mg/mL) | Surfactant |
|---|---|---|---|---|---|---|---|---|---|
| F1 | A5.5N | Liquid | Sodium acetate | 5.5 | 150 mM NaCl | 10 mM | N/A | 0.232 | 0.01% PS20 |
| F2 | A5.5S | Liquid | Sodium acetate | 5.5 | 5% Sorbitol | 10 mM | N/A | 0.232 | 0.01% PS20 |
| F3 | H6N | Liquid | Histidine | 6.0 | 150 mM NaCl | 10 mM | N/A | 0.232 | 0.01% PS20 |
| F4 | H6S | Liquid | Histidine | 6.0 | 5% Sorbitol | 10 mM | N/A | 0.232 | 0.01% PS20 |
| F5* | H6.5N | Liquid | Histidine | 6.5 | 150 mM NaCl | 10 mM | N/A | 0.232 | 0.01% PS20 |
| F6* | H6.5S | Liquid | Histidine | 6.5 | 5% Sorbitol | 10 mM | N/A | 0.232 | 0.01% PS20 |
| F7* | T7N | Liquid | Tris | 7.0 | 150 mM NaCl | 10 mM | N/A | 0.232 | 0.01% PS20 |
| F8* | T7S | Liquid | Tris | 7.0 | 5% Sorbitol | 10 mM | N/A | 0.232 | 0.01% PS20 |
| F13 | CTRL | | 0.232 mg/mL CNT201, 10 mM L-Histidine, 10 mM $CaCl_2$, pH 7.0, 0.01% PS20 | | | | | | |

Note 1)
Form. is an abbreviation for Formulation.

Note 2)
Formulations F5-F8 were prepared using sodium phosphate as a buffer, but calcium phosphate was precipitated. For this reason, the formulations F5-F8 were prepared using, as buffer, histidine or Tris instead of sodium phosphate.

In addition, the osmotic pressure, pH and concentration of each formulation were verified.

Then, each liquid formulation was sterilized and filtered through a 0.2 μm PES membrane in a sterile BSC, and then 1.0 mL of the liquid formulation was added to a 3 cc sterile glass vial. The vial was then sealed with a crimp stopper and labeled.

Example 3: Preparation of Lyophilized Formulation

In this example, a lyophilized formulation for collagenase was prepared using the collagenase mixed solution (CNT201) prepared in Example 1. Before dialysis, 10% PS20 stock solution was added to obtain 0.01% PS20.

Specifically, 7.8 mL of a mixed solution was added to four dialysis cassettes (slide-A-Lyzer Dialysis Cassette, 3500 MWCO) with a collagenase concentration of 2.0 mg/mL to prepare four samples, and then the samples were added to F9 to F12 formulation buffers shown in Table 2 below and allowed to reach equilibration. After time had elapsed, the collagenase solution was recovered from each dialysis cassette and the respective formulation buffers were added to adjust the collagenase concentration to 0.232 mg/mL. 10 mM succinate or histidine was used as a formulation buffer, 1.0% trehalose was used as a tonicity modifier, 10 mM calcium chloride ($CaCl_2$)) was used as a coenzyme, and 4.0% mannitol or 2.5% glycine was used as a bulking agent, and 0.01% polysorbate 20 (PS20) was used as a surfactant.

After lyophilization, the chamber was refilled with nitrogen and the vial was partially evacuated to about -580 Torr using a stopper. The lyophilized glass vials were then sealed with crimp stoppers and labeled. For pre-lyo analysis performed at T=0, additional vials were stored separately and frozen prior to lyophilization.

Experimental Example 1: Analysis Method and Analysis Items

Influences or effects of acute stress and acceleration stability of the liquid formulation and lyophilized formulation prepared according to Examples 2 and 3 were evaluated using the following 11 analysis methods below.

1.1: Visual Inspection

The visual inspection was conducted under a white light source (13 W fluorescent lamp) against a black and white background. All formulations were recorded digitally at all time points.

The liquid formulation was visually inspected as the liquid formulation and the lyophilized formulation was visually inspected as the lyophilized formulation.

1.2: Concentration Measurement

The concentration of CNT201 corresponding to $A_{280}$ obtained using an Implen NanoPhotometer Pearl was analyzed using an E.C. of 1.315 $mg/mL^{-1} \times cm^{-1}$.

The lyophilized formulation was dissolved in Milli-Q water and reconstituted to a liquid state before measurement of the concentration.

TABLE 2

| Form. No. | Form. Code | Form. Type | Buffer (10 mM) | pH | Tonicity Modifier | $CaCl_2$ | Bulking Agent | API (mg/mL) | Surfactant |
|---|---|---|---|---|---|---|---|---|---|
| F9 | LS5.5M | Lyo | Succinate | 5.5 | 1.0% Trehalose | 10 mM | 4.0% Mannitol | 0.232 | 0.01% PS20 |
| F10 | LS5.5G | Lyo | Succinate | 5.5 | 1.0% Trehalose | 10 mM | 2.5% Glycine | 0.232 | 0.01% PS20 |
| F11 | LH6.5M | Lyo | Histidine | 6.5 | 1.0% Trehalose | 10 mM | 4.0% Mannitol | 0.232 | 0.01% PS20 |
| F12 | LH6.5G | Lyo | Histidine | 6.5 | 1.0% Trehalose | 10 mM | 2.5% Glycine | 0.232 | 0.01% PS20 |

In addition, the osmotic pressure, pH and concentration of each formulation were verified.

Then, each liquid formulation was sterilized and filtered through a 0.2 μm PES membrane in a sterile BSC, and then 1.0 mL of the liquid formulation was added to a 3 cc sterile glass vial.

Then, the formulation was lyophilized. That is, the vial was partially sealed with a lyophilization vent stopper and then lyophilized under the conditions shown in Table 3 below.

1.3: pH pH analysis was performed using a Symphony pH Meter ((VWR Scientific, catalog #SB70P) calibrated with three pH standard solutions (pH 4, 7, 10) with a calibration gradient of 95% or higher. Each formulation sample was not calibrated depending on temperature and was equilibrated to room temperature prior to pH measurement.

The lyophilized formulation was dissolved in Milli-Q water and reconstituted to a liquid state before measurement.

TABLE 3

| Step | Temperature | Time | Ramp Rate | Chamber Pressure |
|---|---|---|---|---|
| Loading | 5° C. | N/A | N/A | N/A |
| Freezing | 5° C. to -50° C. | 110 min | 0.5° C./min | N/A |
| Holding | -50° C. | 120 min | N/A | N/A |
| Recrystallization | -50° C. to -15° C. | 70 min | 0.5° C./min | N/A |
| | -15° C. | 120 min | N/A | N/A |
| | -15° C. to -25° C. | 20 min | 0.5° C./min | N/A |
| Primary Drying | -25° C. | 3000 min | N/A | 100 mT |
| Secondary Drying | 25° C. to 25° C. | 100 min | 0.5° C./min | 100 mT |
| | 25° C. | 600 min | N/A | 100 mT |

1.4: Osmotic Pressure

The osmotic pressure concentration at T=0 was measured using a Model 2020 freezing point osmometer (Advanced Instruments).

The lyophilized formulation was dissolved in Milli-Q water and reconstituted to a liquid state before measurement.

1.5: SE-HPLC (Size Exclusion-High Performance Liquid Chromatography)

SE-HPLC was performed under the following conditions.

The lyophilized formulation was dissolved in Milli-Q water and reconstituted to a liquid state before measurement.

TABLE 4

| SE-HPLC Method Parameters ((Agilent 1100) | |
|---|---|
| Column | Tosoh TSKgel G2000SW$_{XL}$, 7.8 mm × 30 cm, 5 μm, P/N 08540 |
| Guard Column | Tosoh TSKgel SW$_{XL}$ Guard, 6.0 mm × 4 cm, 7 μm, P/N 08543 |
| Mobile Phase | 50 mM HEPES, 1 mM CaCl2, 0.2M NaCl, 0.05% Sodium Azide, pH 7.0 |
| Flow Rate | 0.5 mL/min |
| Run Time | 50 minutes |
| Sample Temperature | 5° C. |
| Column Temperature | 25° C. |
| Injection Volume | 100 μL |
| Injection Load | 23.2 μg ((0.232 mg/mL) |
| UV Detection | 280 nm |

1.6: Potency Assay

Potency Assay was performed under the following conditions.

The lyophilized formulation was measured after being dissolved in Milli-Q water and reconstituted to a liquid state.

TABLE 5

| Potency Assay Method Parameters | |
|---|---|
| Instrument | BIO-TEK Synergy ™ HT |
| Activating Buffer | 1 mM FALGPA, 50 mM Tricine, 10 mM CaCl$_2$, 0.4M NaCl, pH 7.5 |
| DP Concentration | 0.075-0.300 mg/mL* |
| Load Volume | 10 μL |
| Buffer Volume | 190 μL |
| Shaking Time | 10 sec |
| Detection Wavelength | 345 nm |
| Run Time | 7 min** |
| Measurement Interval | 1 min |

*In all tests, 0.232 mg/mL of pure DP was analyzed. This non-experimental baseline concentration was used in calculations to determine actual changes in specific enzyme activity throughout the study.
**Running time was set to 7 minutes.

1.7: FlowCAM

Particles were automatically analyzed using a combination of the FlowCAM particle imaging system with optics, electronics and fluidics. An optical system was used to capture real-time images of particles in the fluid as the particles passed through the flow cell. Imaging software was used to measure the size and shape of the particles. All sample formulations were analyzed and degassed at 75 torr for 30 minutes prior to analysis. The lyophilized formulation was dissolved in Milli-Q water and reconstituted to a liquid state before measurement.

1.8: Liquid Reconstitution Time 1.0 mL of sterile-filtered Milli-Q Water was added to the vial containing the lyophilized formulation and at the same time, the timer was started, while the vial was gently agitated. Liquid reconstitution time, i.e., the point at which dissolution was completed, was considered the point at which the cake ingredients completely disappeared when gently stirred.

1.9: Moisture Content (Karl-Fischer Titration)

A Karl Fisher coulometer C20 (Mettler Toledo) was used to analyze moisture content in the lyophilized formulation. AquaStar Water Oven Standard 1% or AquaStar Lactose Oven Standard 5% were used to determine system accuracy. Sample vials were stored at room temperature before removing the vial cap for analysis. About 30 to 50 mg of material was used for each analysis.

1.10: Sub-Ambient DSC

About 10 μL of each sample was frozen at −60° C. using a Pyris Diamond DSC with Intercooler II. The samples were heated until thawed at a ramp rate of 5° C./min and the heat flow during the thawing process was recorded.

1.11: Fourier Transform Infrared Spectroscopy (FTIR)

FTIR is used to obtain infrared absorption spectra of gases, liquids or solids. Regarding IBI, the infrared absorption and wave number [cm$^{-1}$] of the sample raw materials were collected using the FTIR-660 Plus spectrometer. This data provides information about the secondary structure of the polypeptide. The liquid formulation before lyophilization, the liquid formulation reconstituted by dissolving the lyophilized powder in Milli-Q water, and the lyophilized powder itself were analyzed using FTIR spectroscopy.

Using the 11 analysis methods described above, the influence or effects on acute stress and acceleration stability was evaluated and specific analysis items are shown in Table 6 below. Acceleration stability was evaluated by monitoring the effect of temperature over time (temporal change). The temperature used for acceleration stability is set higher than the appropriate storage temperature (acceleration condition, temperature stress). The temperature set in this range enables changes over time to be observed more quickly.

TABLE 6

| Analysis method/analysis method | Acute Stress | | | Temperature Stress Time Points | | | | | |
|---|---|---|---|---|---|---|---|---|---|
| | Agitation | UV | Recon. Liquid | Pre-Lyo | T = 0 | 1 wk | 2 wk | 4 wk | 8 wk |
| Visual | X | X | X | X | X | X | X | X | X |
| Concentration (($A_{280}$)) | — | — | X | X | X | X | X | X | X |
| pH | — | — | X | X | X | X | X | X | X |
| Osmolality | — | — | — | X | X | — | — | — | — |
| SE-HPLC | X | X | X | X | X | X | X | X | X |
| Potency Assay | X | X | X | X | X | X | X | X | X |
| FlowCAM* | X | — | X | X | X | — | — | X | X |
| For Lyophilized Formulations Only | | | | | | | | | |
| Reconstitution Time | — | — | — | — | X | X | X | X | X |
| Moisture Content (KF Titration) | — | — | — | — | X | — | — | — | — |
| Sub-Ambient DSC | — | — | — | X | — | — | — | — | — |
| FTIR | — | — | — | X | X | — | — | — | — |

Note)
'X' means performed.

According to the above analysis, the liquid formulations of F1 to F8 and F13 of Example 2, stability of all sample formulations was not secured due to a decrease in the content of the active ingredient and decomposition when stored for a long time. Accordingly, the lyophilized powder formulation of the present invention was developed. Lyophilized powders were prepared using compositions under various conditions, the conditions enabling a product with normal quality to be obtained were optimized, and whether or not the product thus obtained can maintain normal quality for a long time were determined.

Accordingly, the results of acute stress and acceleration stability (temperature stress) measurement of samples with the lyophilized formulations of F9 to F12 of Example 3 will be described below;

Experimental Example 2: Acute Stress Evaluation Results

Representative environmental factors that act as stress in the laboratory are agitation, ultraviolet, and reconstitution to liquid. Actual environmental factors include physical shock, exposure to sunlight or indoor fluorescent lights, and diluent dissolution. In Experimental Example 2, acute stress was applied in order to select excellent formulations because it is generally difficult to obtain results quickly by evaluating gradual changes over time during storage.

In Experimental Example 2, acute stress was added to the lyophilized formulation prepared in Example 3 of the present invention using the method of Experimental Example 1, to evaluate acute stress. Acute stress was evaluated in terms of three aspects: the effect of agitation, the effect of ultraviolet (UV) exposure, and the effect of liquid reconstitution.

Experimental Example 2-1: Effect of Agitation

Agitation is a method of applying acute stress in order to simulate physical shock in an actual environment.

The sample vial containing the formulation according to Example 3 was dissolved in Milli-Q water and reconstituted to a liquid state, and then stirred on an orbital shaker set at 1,000 RPM at room temperature for 4 consecutive hours. At the same time, as a control sample, another sample having the same formulation was incubated for the same time in a static environment at room temperature without stirring.

The results are shown in Table 7 below.

TABLE 7

| Form. No. | Buffer (10 mM) | pH | Bulking Agent | Visual analysis | SE-HPLC | Activity | FlowCAM analysis |
|---|---|---|---|---|---|---|---|
| F9 | Succinate | 5.5 | 4.0% Mannitol | Small number of transparent and colorless particles | Slightly high HMWS | Similar | Small change in particle concentration |
| F10 | Succinate | 5.5 | 2.5% Glycine | Small number of transparent and colorless particles | N/A | Similar | Small change in particle concentration |
| F11 | Histidine | 6.5 | 4.0% Mannitol | Small number of transparent and colorless particles | N/A | Similar | Small change in particle concentration |
| F12 | Histidine | 6.5 | 2.5% Glycine | Small number of transparent and colorless particles | N/A | Similar | Small change in particle concentration |

As can be seen from Table 7 above, the result of visual analysis showed that all samples were transparent and colorless regardless of stress conditions. Visual analysis evaluated with the naked eye is qualitative and thus directly determining the size of particles is difficult. Therefore, visual analysis is only meaningful to the extent of determining whether or not large particles are clearly produced. It was not possible to determine superiority or inferiority between formulations through visual analysis.

SE-HPLC is a general method of quantitatively analyzing aggregates that are difficult to identify with the naked eye. The result of SE-HPLC analysis showed that slightly higher HMWS (high-molecular-weight species) aggregation was observed in the F9 sample.

In other words, comparing the F9 sample with the F10 sample, under formulation conditions with the same succinate buffer and pH 5.5, slightly higher HMWS aggregation was observed in the sample using mannitol as a bulking agent (F9 sample) due to the slightly higher shear force caused by stirring, whereas such aggregation was not observed in the sample using glycine as a bulking agent (F10 sample).

In addition, comparing the F9 sample with the F11 sample, under mannitol formulation conditions with the same bulking agent, slightly higher HMWS aggregation was observed in the succinate buffer pH 5.5 formulation, whereas such aggregation was not observed in the histidine buffer pH 6.5 formulation.

In addition, collagenase activity analysis showed that all formulations had collagenase activity of 3.71 to 4.23 FALGPA units/mg protein, which was similar to static control samples (3.53 to 3.86 FALGPA units/mg protein). In addition, the results of the FlowCAM analysis showed that a small change in particle concentration was observed in all formulations after 4 hours, regardless of stirring stress.

This indicates that glycine is more suitable than mannitol as a bulking agent and histidine is more suitable than succinate as a buffer.

Experimental Example 2-2: Effect of Ultraviolet (UV) Exposure

The formulation according to Example 3 and the formulation reconstituted to a liquid state using water immediately before the experiment were placed in a photostability chamber at 25° C. and exposed to ultraviolet (UV) light to mimic routine exposure to ultraviolet rays.

At the same time, as a control sample, another sample with the same formulation (lyophilized formulation and its liquid restoration solution) was prepared, wrapped in foil, and placed in a sample box blocked from light. These formulations blocked from light were incubated in the same conditions in a photostability chamber for the same period of time as the formulations exposed to light.

The results were as shown in Table 8 below.

TABLE 8

| Form. No. | Buffer (10 mM) | pH | Bulking Agent | Visual analysis | SE-HPLC | Activity |
|---|---|---|---|---|---|---|
| F9 | Succinate | 5.5 | 4.0% Mannitol | Small number of transparent and colorless particles | N/A | Similar |
| F10 | Succinate | 5.5 | 2.5% Glycine | Small number of transparent and colorless particles | N/A | Similar |
| F11 | Histidine | 6.5 | 4.0% Mannitol | Small number of transparent and colorless particles | N/A | Similar |
| F12 | Histidine | 6.5 | 2.5% Glycine | Small number of transparent and colorless particles | N/A | Similar |

As can be seen from Table 8 above, the result of visual analysis showed that all samples were transparent and colorless both before and after UV exposure, and there was a small number of visible particles. For visual analysis, samples in the form of lyophilized powder dissolved in water were observed.

In SE-HPLC analysis, similar chromatographic profiles were observed in all samples regardless of stress conditions after the end of incubation. In addition, no significant differences were found between UV-protected and UV-exposed samples regardless of lyophilization conditions.

The result of collagenase activity analysis showed that, after UV exposure, similar collagenase activity of 3.83 to 4.12 FALGPA units/mg protein was observed in all UV-exposed lyophilized formulations, similar to the corresponding UV protection control (3.79 to 4.12 FALGPA Units/mg protein).

Experimental Example 2-3: Effect of Liquid Reconstitution

One sample of each formulation of Example 3 was dissolved (reconstituted to liquid) in 1 mL of Milli-Q Water and stored at 25° C. for 24 hours. Other samples were dissolved (reconstituted to liquid) in parallel and stored at 5° C. for the same time.

The results are shown in Table 9 below.

TABLE 9

| Form. No. | Buffer (10 mM) | pH | Bulking Agent | Visual analysis | Concentration | pH | SE-HPLC | Activity | FlowCAM |
|---|---|---|---|---|---|---|---|---|---|
| F9 | Succinate | 5.5 | 4.0% Mannitol | Small number of transparent and colorless particles | Similar concentration | No change | Similar purity | Similar | Low particle |
| F10 | Succinate | 5.5 | 2.5% Glycine | Small number of transparent and colorless particles | Similar concentration | No change | Similar purity | Similar | Low particle |
| F11 | Histidine | 6.5 | 4.0% Mannitol | Small number of transparent and colorless particles | Similar concentration | No change | Similar purity | Similar | Low particle |
| F12 | Histidine | 6.5 | 2.5% Glycine | Small number of transparent and colorless particles | Similar concentration | No change | Similar purity | Similar | Low particle |

When aggregation has occurred or decomposition has progressed under the influence of dissolution based on liquid reconstitution, the concentration of collagenase will change. Therefore, the degree of change due to the effect of dissolution can be determined by measuring the concentration. Likewise, changes in pH and increase in fine particles using FlowCAM are also factors to determine the effect of dissolution.

As can be seen from Table 9 above, the result of visual analysis that all samples were transparent and colorless regardless of storage temperature after 1 day, and a small number of particles was visually observed.

The result of centration analysis showed that, after dissolution and exposure to temperature stress for 1 day, concentrations similar to the target of 221 mg/mL to 0.240 mg/mL were observed in all formulations regardless of storage temperature.

The result of pH analysis showed that, after dissolution and exposure to temperature stress for 1 day, a pH equal to or similar to the target pH (small deviation of +0.1) was observed in all formulations regardless of storage temperature.

The result of SE-HPLC analysis showed that, after dissolution and 1 day of temperature stress, similar chromatographic profiles were observed in all formulations regardless of storage temperature. All formulations at 25° C. showed peak percentages similar to the samples at 5° C.

The result of the collagenase activity assay shows that, after dissolution and temperature stress for one day, similar collagenase activity of 4.00-4.25 FALGPA units/mg protein was observed in all formulations regardless of storage temperature.

The result of FlowCAM analysis showed that, after dissolution and temperature stress for one day, small changes in particle concentration were observed in all formulations, regardless of storage temperature.

Experimental Example 3: Acceleration Stability (Temperature Stress) Evaluation Results Acceleration stability (temperature stress time points) of the example formulations of the present invention was evaluated using the method of Experimental Example 1.

Sample vials containing formulations according to Examples 2 and 3 above were placed at 5° C., 25° C., and 40° C., respectively, at T=0 week, and then analyzed after 8 weeks.

Experimental Example 3-1: Visual Analysis Under Temperature Acceleration Conditions At T=0 (time zero), all pre-lyophilized formulations were transparent and colorless, with no visible particles.

TABLE 10

| | | | | visual analysis | | | | |
|---|---|---|---|---|---|---|---|---|
| | | | | | | T = 8 week | | |
| Form. No. | Buffer (10 mM) | pH | Bulking Agent | Pre-lyo | T = 0 week | 5° C. | 25° C. | 40° C. |
| F9 | Succinate | 5.5 | 4.0% Mannitol | | | No transparent and colorless particles | Small number of transparent and colorless particles | |
| F10 | Succinate | 5.5 | 2.5% Glycine | | | No transparent and colorless particles | Small number of transparent and colorless particles | |

TABLE 10-continued

| | | | | | visual analysis | | |
|---|---|---|---|---|---|---|---|
| | | | | | | T = 8 week | |
| Form. No. | Buffer (10 mM) | pH | Bulking Agent | Pre-lyo | T = 0 week | 5° C. | 25° C. | 40° C. |
| F11 | Histidine | 6.5 | 4.0% Mannitol | | No transparent and colorless particles | | Small number of transparent and colorless particles | |
| F12 | Histidine | 6.5 | 2.5% Glycine | | No transparent and colorless particles | | Small number of transparent and colorless particles | |

The lyophilized formulations (F10, F12) to which glycine was added at the start of the experiment had good appearance, but the lyophilized formulations (F9, F11) to which mannitol was added were slightly shrunken. There was no significant change in the lyophilized cake at the 8th week. In all formulations, the lyophilized formulations dissolved before and immediately after lyophilization were transparent and colorless, and no particles were observed. At the 8th week, the dissolved lyophilized formulation was transparent and colorless, but a few particles were visually observed.

Experimental Example 3-2: Concentration Analysis Depending on Temperature Acceleration Conditions When aggregation or decomposition occurs under the influence of temperature, the concentration of collagenase changes. Therefore, the degree of change due to the influence of temperature may be determined by measuring the concentration.

All formulations had concentrations similar to the target, ranging from 0.257 mg/mL to 0.264 mg/mL at T=0. Most formulations had concentrations similar to the target at 5° C. and 25° C. until the 8th week after the start of the experiment, but F9 to F12 had a decrease in concentration at the 8th week. At 40° C., most formulations had lower concentrations than the target. Particularly, F10, F11, and F12 formulations had the highest concentrations.

TABLE 11

| | | | | | | Concentration analysis | | |
|---|---|---|---|---|---|---|---|---|
| | | | | | | | T = 8 week | |
| Form. No. | Buffer (10 mM) | pH | Bulking Agent | Pre-lyo | T = 0 week | 5° C. | 25° C. | 40° C. |
| F9 | Succinate | 5.5 | 4.0% Mannitol | 0.185 ± 0.001 | 0.257 ± 0.003 | 0.179 ± 0.008 | 0.195 ± 0.026 | 0.218 ± 0.017 |
| F10 | Succinate | 5.5 | 2.5% Glycine | 0.220 ± 0.012 | 0.257 ± 0.011 | 0.194 ± 0.011 | 0.236 ± 0.011 | 0.236 ± 0.004 |
| F11 | Histidine | 6.5 | 4.0% Mannitol | 0.236 ± 0.003 | 0.264 ± 0.007 | 0.195 ± 0.003 | 0.264 ± 0.015 | 0.242 ± 0.003 |
| F12 | Histidine | 6.5 | 2.5% Glycine | 0.234 ± 0.013 | 0.258 ± 0.008 | 0.202 ± 0.009 | 0.243 ± 0.006 | 0.239 ± 0.003 |

In particular, the F9 formulation had lower concentrations than the initial concentration at 5° C., 25° C., and 40° C. until the 8th week after the start of the experiment.

Experimental Example 3-3: pH Analysis Depending on Temperature Acceleration Conditions The result of pH analysis showed that, after the 8th week, all formulations had a pH similar to T=0 within a small deviation (±0.1) regardless of storage temperature.

TABLE 12

| | | | | | | pH analysis | | |
|---|---|---|---|---|---|---|---|---|
| | | | | | | | T = 8 week | |
| Form. No. | Buffer (10 mM) | pH | Bulking Agent | Pre-lyo | T = 0 week | 5° C. | 25° C. | 40° C. |
| F9 | Succinate | 5.5 | 4.0% Mannitol | 5.6 | 5.7 | 5.6 | 5.6 | 5.6 |
| F10 | Succinate | 5.5 | 2.5% Glycine | 5.6 | 5.6 | 5.6 | 5.6 | 5.6 |
| F11 | Histidine | 6.5 | 4.0% Mannitol | 6.6 | 6.6 | 6.6 | 6.6 | 6.6 |
| F12 | Histidine | 6.5 | 2.5% Glycine | 6.6 | 6.6 | 6.6 | 6.6 | 6.6 |

Experimental Example 3-4: Osmotic Pressure Analysis Depending on Temperature Acceleration Conditions Osmotic pressure is an indicator to determine whether or not the formulation has been produced properly. When the difference from the theoretical value is greater than the experimental error, the formulation was produced improperly. Since osmotic pressure is not a test method that can detect the effect of temperature, it was measured only at T=0 in the solution before lyophilization and immediately after lyophilization.

The method of the osmotic pressure concentration analysis showed that the osmotic pressure at T=0 of the solution in which all lyophilized formulations (excluding the control group) were reconstituted to liquid as water ranged from 292 mOsm/kg to 398 mOsm/kg. This value was similar to the pre-lyo sample.

TABLE 13

| | | | | Osmotic pressure analysis | | | | |
| | | | | | | T = 0 | T = 8 week | | |
| Form. No. | Buffer (10 mM) | pH | Bulking Agent | Theoretical | Pre-lyo week | week | 5° C. | 25° C. | 40° C. |
| --- | --- | --- | --- | --- | --- | --- | --- | --- | --- |
| F9 | Succinate | 5.5 | 4.0% Mannitol | 299 | 320 | 318 | N/A | N/A | N/A |
| F10 | Succinate | 5.5 | 2.5% Glycine | 412 | 408 | 398 | N/A | N/A | N/A |
| F11 | Histidine | 6.5 | 4.0% Mannitol | 289 | 305 | 292 | N/A | N/A | N/A |
| F12 | Histidine | 6.5 | 2.5% Glycine | 402 | 397 | 382 | N/A | N/A | N/A |

Experimental Example 3-5: Analysis of Liquid Reconstitution Time Depending on Temperature Acceleration Conditions Measuring the liquid reconstitution time (i.e., dissolution time) is a method of determining changes in the formulation over time under accelerated temperature conditions. For example, a lyophilized formulation having a relatively high moisture content becomes harder over time, as the lyophilized cake agglomerates, which will cause an increase in the liquid reconstitution time (i.e., dissolution time).

Dissolution time analysis showed that, after week 8, all formulations had fast dissolution times (≤10 seconds), and at T=0, the glycine-containing formulations (F10 and F12) had very fast dissolution times compared to the mannitol formulations (F9 and F11). Nevertheless, the fact that the dissolution time of all formulations was less than 10 seconds at week 8 means that the superiority of the formulations cannot be determined in terms of dissolution time alone and all can be determined to be excellent.

TABLE 14

| | | | | Liquid reconstitution time analysis | | | | |
| | | | | | T = 0 | T = 8 week | | |
| Form. No. | Buffer (10 mM) | pH | Bulking Agent | Pre-lyo | week | 5° C. | 25° C. | 40° C. |
| --- | --- | --- | --- | --- | --- | --- | --- | --- |
| F9 | Succinate | 5.5 | 4.0% Mannitol | N/A | 34.51 | 8.28 | 8.87 | 2.97 |
| F10 | Succinate | 5.5 | 2.5% Glycine | N/A | 7.03 | 4.13 | 2.46 | 2.46 |
| F11 | Histidine | 6.5 | 4.0% Mannitol | N/A | 17.49 | 4.46 | 5.82 | 3.66 |
| F12 | Histidine | 6.5 | 2.5% Glycine | N/A | 6.89 | 2.02 | 3.35 | 2.02 |

Experimental Example 3-6: Analysis of Moisture Content Depending on Temperature Acceleration Conditions Humidity acts as an essential factor in the formation and maintenance of lyophilized formulations. As the combination of formulation ingredients becomes better, the moisture content decreases. In many cases in the art, the standard for moisture content is set at 3.0% or less.

The result of the moisture content analysis showed that all lyophilized formulations had low moisture content (<1.5%) at T=0 and the glycine formulations (F10 and F12) had lower moisture content than the mannitol formulations (F9 and F11).

TABLE 15

| | | | | Moisture content analysis | | | | |
|---|---|---|---|---|---|---|---|---|
| Form. | Buffer | | Bulking | | T = 0 | T = 8 week | | |
| No. | (10 mM) | pH | Agent | Pre-lyo | week | 5° C. | 25° C. | 40° C. |
| F9 | Succinate | 5.5 | 4.0% Mannitol | N/A | 1.26 | N/A | N/A | N/A |
| F10 | Succinate | 5.5 | 2.5% Glycine | N/A | 0.70 | N/A | N/A | N/A |
| F11 | Histidine | 6.5 | 4.0% Mannitol | N/A | 1.07 | N/A | N/A | N/A |
| F12 | Histidine | 6.5 | 2.5% Glycine | N/A | 0.66 | N/A | N/A | N/A |

Experimental Example 3-7: FTIR Analysis Depending on Temperature Acceleration Conditions The result of FTIR analysis showed that all dissolved lyophilized formulations at T=0 showed similar FTIR spectra compared to the pre-lyo sample. This indicated that no denaturation of collagenase occurred during lyophilization.

Experimental Example 3-8: SE-HPLC Analysis Depending on Temperature Acceleration Conditions The result of SE-HPLC analysis showed that all formulations showed similar chromatographic profiles at T=0.

TABLE 16

| | | | | HMWS(%) by SE-HPLC analysis | | | | |
|---|---|---|---|---|---|---|---|---|
| Form. | Buffer | | Bulking | | T = 0 | T = 8 week | | |
| No. | (10 mM) | pH | Agent | Pre-lyo | week | 5° C. | 25° C. | 40° C. |
| F9 | Succinate | 5.5 | 4.0% Mannitol | N/A | 0.0 | 1.1 | 1.2 | 2.2 |
| F10 | Succinate | 5.5 | 2.5% Glycine | N/A | 0.0 | 0.6 | 1.2 | 2.7 |
| F11 | Histidine | 6.5 | 4.0% Mannitol | N/A | 0.0 | 0.7 | 0.8 | 1.0 |
| F12 | Histidine | 6.5 | 2.5% Glycine | N/A | 0.0 | 0.5 | 0.5 | 0.5 |

However, after incubation for 8 weeks, a slight increase in HMWS was observed in the lyophilized succinate formulations (F9 and F10). The ratio of HMWS increased proportionally at 25° C. and 40° C., where temperature has a large influence, and the same buffer component showed similar HMWS, so the formulation using histidine was determined to be more advantageous under temperature acceleration conditions than the formulation using succinate. The pH to be maintained may vary depending on the buffer ingredient, but the pH 6.5 of the histidine formulation may be determined to be better than the pH 5.5 of the succinate formulation.

Experimental Example 3-9: Collagenase Activity Analysis Depending on Temperature Acceleration Conditions The result of the collagenase activity analysis showed that, at T=0, all formulations had similar collagenase activity of 2.77 to 3.33 FALGPA units/mg protein, which was slightly higher than the assay control (2.37 FALGPA units/mg protein).

TABLE 17

| Form. No. | Buffer (10 mM) | pH | Bulking Agent | Specific Activity analysis (FALGPA Unit/mg protein) | | | |
|---|---|---|---|---|---|---|---|
| | | | | Pre-lyo | T = 0 week | T = 8 week 5° C. | 25° C. | 40° C. |

| Form. No. | Buffer (10 mM) | pH | Bulking Agent | Pre-lyo | T = 0 week | 5° C. | 25° C. | 40° C. |
|---|---|---|---|---|---|---|---|---|
| F9 | Succinate | 5.5 | 4.0% Mannitol | N/A | 3.08 | 3.05 | 3.18 | 2.66 |
| F10 | Succinate | 5.5 | 2.5% Glycine | N/A | 3.23 | 3.05 | 3.26 | 2.96 |
| F11 | Histidine | 6.5 | 4.0% Mannitol | N/A | 3.23 | 3.22 | 3.28 | 3.24 |
| F12 | Histidine | 6.5 | 2.5% Glycine | N/A | 3.24 | 3.17 | 3.04 | 3.29 |

In addition, after incubation at 25° C. for 8 weeks, all formulations excluding F13 had collagenase activity (2.49-3.28 FALGPA units/mg protein) similar to or slightly lower than T=0.

However, after incubation at 40° C. for 8 weeks, the histidine-containing lyophilized formulations (F11, F12) had the highest collagenase activity (3.24-3.29 FALGPA units/mg protein) among all formulations.

Experimental Examples 3-10: FlowCAM Analysis Depending on Temperature Acceleration Conditions The result of FlowCAM analysis showed that, at T=0, all lyophilized formulation samples had small changes in particle concentration.

After 8 weeks, most formulations had small changes in particle concentration at 5° C. and 25° C., and lyophilized formulations (F10-F12) excluding F9 had relatively small changes in particle concentration at 40° C. The F12 formulation had a relatively high concentration of particles in the pre-lyophilized formulation stored at −70° C. On the other hand, when the F12 formulation was a lyophilized formulation, it had a relatively lower change in particle concentration than the F9-F11 formulations under temperature acceleration conditions.

Based on the result of the acceleration stability (temperature stress) test of Experimental Examples 3-1 to 3-10 described above, comparing sample F9 with sample F10, under pH 5.5 formulation conditions with the same succinate buffer, when mannitol was used as a bulking agent, a decrease in concentration, delayed dissolution time, high moisture content, increase in HMWS (%), and increase in particle concentration occurred under accelerated temperature conditions. This indicates that glycine is more suitable as a bulking agent than mannitol.

In addition, comparing sample F9 with sample F11, the pH 5.5 formulation adjusted with the succinate buffer under the mannitol formulation condition with the same bulking agent had decreased concentration, decreased collagenase activity, increased HMWS (%), and increased particle concentration under temperature acceleration conditions. This indicates that histidine was more suitable as a buffer than succinate.

In addition, comparing the sample F10 with sample F12, the pH 5.5 formulation adjusted with the succinate buffer under the glycine formulation condition with the same bulking agent had decreased collagenase activity and increased HMWS (%) under temperature acceleration conditions. This indicates that histidine was more suitable as a buffer than succinate.

Although the preferred embodiments of the present invention have been disclosed for illustrative purposes, those

TABLE 18

| Form. No. | Buffer (10 mM) | pH | Bulking Agent | Particles/mL | FlowCAM analysis | | | | |
|---|---|---|---|---|---|---|---|---|---|
| | | | | | Pre-lyo | T = 0 week | 5° C. | 25° C. | 40° C. |
| F9 | Succinate | 5.5 | 4.0% Mannitol | >5 μm | 55 | 89 | 106 | 213 | 2030 |
| | | | | >10 μm | 17 | 34 | 34 | 60 | 178 |
| | | | | >25 μm | 5 | 5 | 5 | 13 | 13 |
| F10 | Succinate | 5.5 | 2.5% Glycine | >5 μm | 63 | 80 | 59 | 73 | 136 |
| | | | | >10 μm | 34 | 34 | 21 | 38 | 42 |
| | | | | >25 μm | 5 | 9 | 5 | 5 | 5 |
| F11 | Histidine | 6.5 | 4.0% Mannitol | >5 μm | 39 | 30 | 241 | 34 | 56 |
| | | | | >10 μm | 17 | 9 | 93 | 9 | 26 |
| | | | | >25 μm | 5 | 0 | 9 | 5 | 13 |
| F12 | Histidine | 6.5 | 2.5% Glycine | >5 μm | 1227 | 25 | 68 | 30 | 34 |
| | | | | >10 μm | 152 | 9 | 38 | 9 | 13 |
| | | | | >25 μm | 5 | 0 | 9 | 5 | 5 |

The invention claimed is:

1. A lyophilized formulation comprising:
   collagenase as an enzyme;
   calcium as a coenzyme;
   histidine as a formulation additive; and
   glycine as another formulation additive.

2. The lyophilized formulation according to claim 1, wherein the collagenase enzyme is present in an amount of 0.3 to 20.8% by weight based on the total weight of the composition.

3. The lyophilized formulation according to claim 1, wherein the calcium is present in the form of a calcium salt.

4. The lyophilized formulation according to claim 3, wherein the calcium or calcium salt is present in an amount of 0.4 to 28% by weight based on the total weight of the composition.

5. The lyophilized formulation according to claim 1, wherein the histidine is present in an amount of 0.4 to 29.9% by weight based on the total weight of the composition.

6. The lyophilized formulation according to claim 1, wherein the glycine is present in an amount of 15 to 94.6% by weight based on the total weight of the composition.

7. The lyophilized formulation according to claim 1, further comprising trehalose as another formulation additive.

8. The lyophilized formulation according to claim 1, further comprising polysorbate 20 (PS20) as a surfactant.

9. The lyophilized formulation according to claim 1, wherein the composition has a pH of 6.0 to 7.0.

10. A solution prepared by mixing the lyophilized composition according to claim 1 with a diluent.

11. The lyophilized formulation according to claim 3, wherein the calcium or calcium salt is present in an amount of 0.4 to 28% by weight based on the total weight of the composition.

* * * * *